United States Patent [19]

Chapman

[11] 4,439,812

[45] Mar. 27, 1984

[54] IMPREGNATED CAPACITOR FOIL

[75] Inventor: Thomas G. Chapman, Hudson Falls, N.Y.

[73] Assignee: General Electric Company, Hudson Falls, N.Y.

[21] Appl. No.: 317,043

[22] Filed: Nov. 2, 1981

[51] Int. Cl.³ .......................... H01G 3/04; B32B 3/28
[52] U.S. Cl. ..................................... 361/314; 428/182
[58] Field of Search ....................... 361/303, 327, 314; 428/182

[56] References Cited

U.S. PATENT DOCUMENTS 3,746,953  7/1973  Lapp et al. .......................... 361/314
4,172,164 10/1979  Meyer ............................ 428/182 X
4,228,481 10/1980  DiNicola et al. ................... 361/314

FOREIGN PATENT DOCUMENTS 106535  9/1937  Australia .
871344  5/1971  Canada .
 10363  4/1980  European Pat. Off. ............ 361/303
 48105  5/1981  United Kingdom ................ 428/182

Primary Examiner—Donald A. Griffin
Attorney, Agent, or Firm—J. J. Lichiello; A. E. Bahr

[57] ABSTRACT

Capacitor foil is passed between a lateral fluted roller and a backing plate to produce a rectangular foil strip having a closely spaced array of parrallel flutes transversely thereof, with part of the flute depth being impressed into the metal and part being due to the bonding of the metal to form the flutes.

4 Claims, 6 Drawing Figures

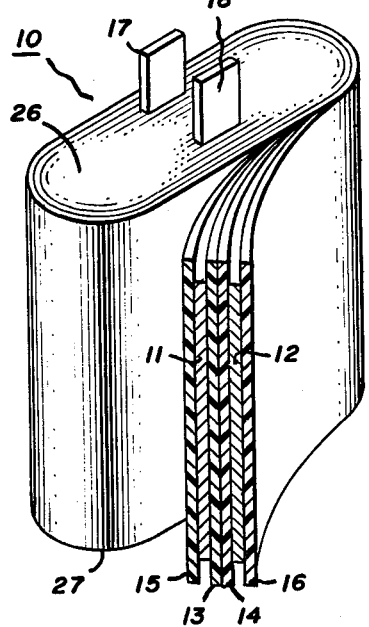
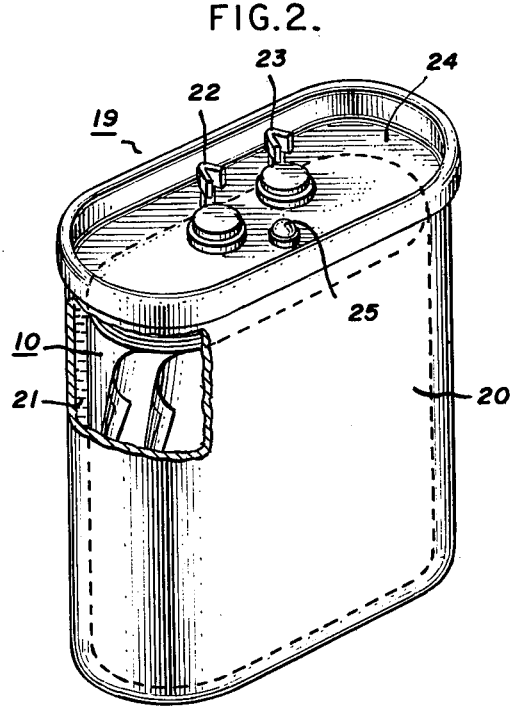
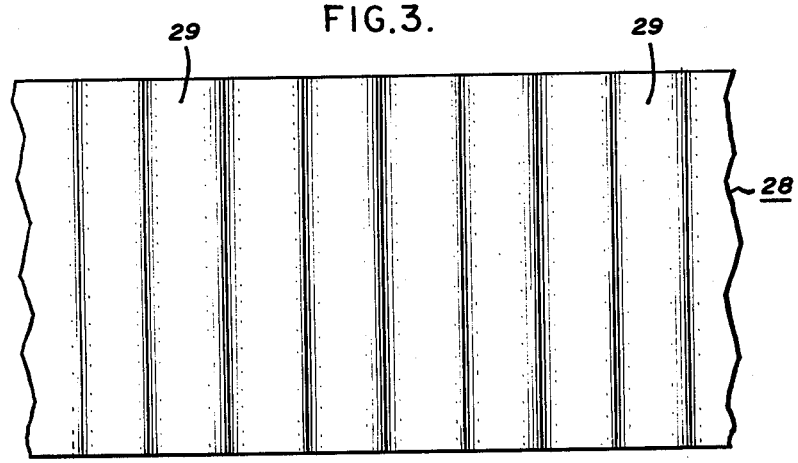

IMPREGNATED CAPACITOR FOIL

This invention relates to an improved capacitor grade aluminum foil as an electrode for electrical capacitors, and more particularly to a dielectric fluid filled capacitor structure wherein the foil electrode strips have line embossed surfaces to stabilize a spaced relationship from adjacent surfaces and to facilitate fluid penetration into the capacitor.

BACKGROUND OF THE INVENTION

Fluid impregnated capacitors made up of alternating electrode foil and synthetic resin film strips wound in a tight roll form have been difficult to impregnate with dielectric fluids because the capacitor roll is wound with a certain degree of tightness, and the fluid must not only penetrate into the roll from the ends thereof, but must also penetrate the interfaces between film strips which stick together, and between film and foil strips which also stick together. In order to overcome this well known and common problem, a number of solutions have been proposed which relate to complex fluid impregnation cycles, film etching, and roughening of the foil, including mechanical and chemical processes such as foil embossing, abrading, and coating.

The problems associated with these solutions have been numerous, including poor overall fluid impregnation and unsatisfactory electrical test results. There is an undesirable increase in thickness of the capacitor roll without correlation to the required space factor of a capacitor roll, and poor economics because of the additional processing required. More importantly, the reliability and repeatability of acceptable electrical tests for capacitors produced from the usual manufacturing processes have been deleteriously affected by these prior solutions.

THE INVENTION

It has been discovered that the foregoing problems may be overcome or minimized by the use of a specially embossed line patterned aluminum electrode foil surface. This pattern is defined as a grating comprising a large number of closely spaced uniform flutes or channels perpendicular to the longitudinal edge of a foil strip and encompassing at least one surface thereof. This surface, when used with dielectric fluids facilitates fluid impregnation of a capacitor roll to provide an improved, more stable capacitor of uniform space factor. The foil is particularly useful where a synthetic resin film such as polypropylene film is the sole dielectric between patterned foil electrodes.

THE DRAWINGS

This invention will be better understood when taken in connection with the following description and drawings in which:

FIG. 1 is an exaggerated illustration of a capacitor roll in partly enrolled form to show dielectric film and electrode foil relationships.

FIG. 2 is an illustration of an electrical capacitor assembly utilizing a single capacitor roll in FIG. 1.

FIG. 3 is an exaggerated schematic plan view of a section of foil electrode showing the line pattern of this invention embodied in electrode foil.

FIG. 4 is an exaggerated schematic edge view of the foil of FIG. 3.

DESCRIPTION OF THE INVENTION

Figure 5:
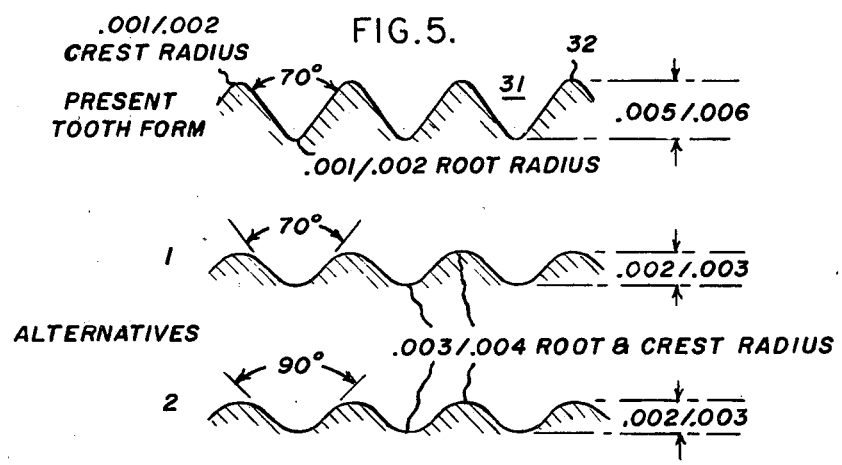
FIG. 5 is an exaggerated schematic of an embossing tool surface.

Referring now to FIG. 1 there is illustrated a capacitor roll 10 in a partly unrolled form. Roll 10 includes a pair of spaced metal foil strip electrodes 11 and 12 and intermediate synthetic resin strips such as polypropylene film strips 13 and 14. Additional polypropylene film strips 15 and 16 complete the roll so that pairs of polypropylene film strips are found between metal foil electrode strips throughout the roll. Tap straps 17 and 18 are inserted into the roll 10 to lie adjacent the electrode strips to serve as electrical connections for the electrodes. Because of various tolerances in the materials of construction, thermal tolerances, swelling of the dielectric, and the need for fluid penetration, the capacitor roll 10 is designed with a certain degree of looseness, referred to as space factor. However, excessive space factor is highly undesirable for both the assembly and the electrical operation of the capacitor.

One or more capacitor rolls 10 are inserted into an appropriate casing or can, the casing is filled with a dielectric fluid, and the fluid is caused to penetrate and permeate the roll to fill up the spaces between the windings of the roll (space factor) as well as into the polypropylene material itself. One such capacitor 19 is shown in FIG. 2 wherein a single roll 10 is included in a can or casing 20 filled with dielectric fluid 21. Can 20 includes a pair of electrical terminals 22 and 23 to which taps 17 and 18 are connected. Cover 24, which is sealed in can 20, includes a small aperture (not shown) which is used to introduce fluid into the can 20 and is thereafter solder sealed as depicted by the solder 25.

Because of the tightness of the windings of rolls 10 and the fact that the metal foil strip electrodes constitute essentially an impermeable lateral barrier, the fluid must enter through the roll ends 26 and 27, FIG. 1. At this point, because of the elevated temperatures used in vacuum drying of the rolls as well as in the impregnation process, the polypropylene film strips FIG. 1 tend to seal to the electrode strips and swell tightly with adjacent strips when absorbing fluid, thus hindering the penetration of the fluid into the roll.

In the present invention the use of a line embossed metal foil electrode strip provides a controlled permeable spacer means and fluid penetration paths into the rolls 10 from the roll end in a unique and economical manner. The line pattern projects from one side of the foil and provides direct fluid passages to the center of the roll which is the most difficult section to impregnate. The line embossed pattern foil 28 of this invention is shown in an exaggerated fashion in FIG. 3.

Referring now to FIG. 3 an aluminum foil electrode 28 is shown in plan view and comprises a uniform series of very small flutes or channels 29 running laterally across the foil. These flutes 29 represent the shortest path across the foil and are adapted to facilitate the penetration of fluid into a capacitor roll. In this respect the flutes may be slightly angled in one or more directions or may be localized in that their extended length may be confined to one or both margins of the foil, or to the center section of the foil or both, depending on the exigencies of the manufacturing and assembling operations of the final capacitors.

There are a number of important factors relating to the flutes of this invention which are better described with respect to the exaggerated FIG. 4. Referring now to FIG. 4 the foil 28 shows a series of flutes 29 which have been indented into the plane 30 of the foil surface from one side only. The object of this procedure is to limit the overall thickness of the foil measured from the apex of one flute to the trough of an adjacent flute. In some procedures where the indentations are equal and opposite the overall thickness of the foil may be double the indentation depth, and to reduce this excessive dimension (with its undesirable space factor) miniature projections must be used on the foil indenting tool. By the present invention either a more conveniently larger indenting tool may be employed, or, for the same smaller size the overall thickness of the foil is still further decreased. The elimination of flat spots between the flutes and the close spacing of the flutes are instrumental in the successful use of this electrode.

Each flute 29 may be described as a relatively sharply defined tooth-like member whose hollowness defines the flute. Because of the narrow curvature along the crown or apex of the tool which indents the flute, the flutes have their internal small crown surface work hardened, particularly at the curvature between the vertical and horizontal surface. This process provides a positive work hardened bending to the foil which greatly increases its resistance to wipe out.

The spacing of the flutes of this invention as well as their height are important and interrelated factors. In one practice of this invention the flute depth and thickness were in the range from about 0.001 inch to about 0.003 inch and the wall angle of a flute was in the range of from about 70° to 90° to the vertical. It is desirable that the overall thickness of the foil measured vertically from the peak of one flute to the peak of an opposite flute be less than about 3 times the original thickness of the metal of the foil, and preferably less than about 2 times. A spacing between flutes of about 0.00125 inch provides excellent results. Since an embossing pattern on a foil electrode may increase the space factor to undesirable limits the pattern is chosen to be as small as possible yet as prominent and fixed as possible to permit the penetration of fluid therealong. At the same time, a full pattern is used over the active capacitance surface of the foil.

Figure 6:
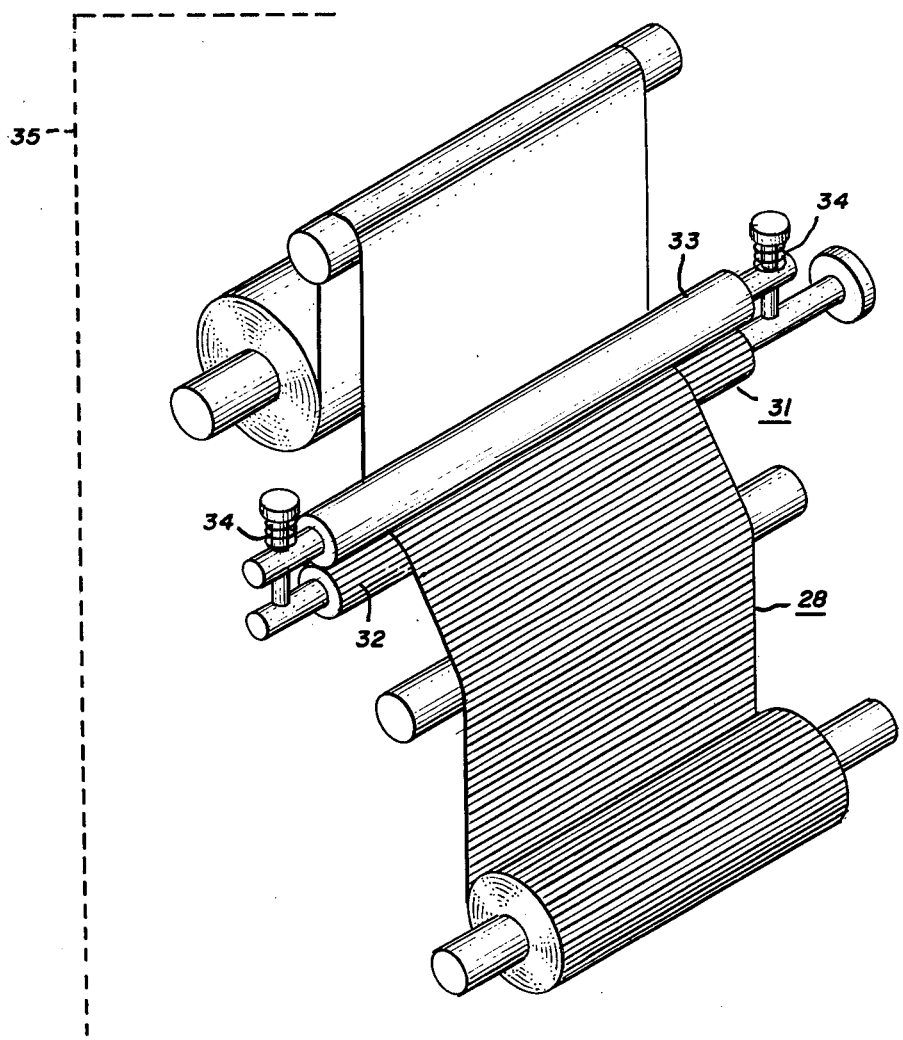
FIG. 6 illustrates a schematic process of embossing the foil of this invention.

The foregoing relationships are best described with respect to the embossing tool and the process of embossing the foil as illustrated in FIGS. 5 and 6 which are also one example of the practice of this invention.

Referring now to FIG. 5 there is illustrated an exaggerated schematic of the surface of an embossing tool of this invention. Tool 31 is a cylindrical roll having a series of projecting axial ribs or teeth 32 in a spaced array about its periphery. Each tooth 32 is a rounded and shaped tooth being on the order of 0.005 to 0.006 inch in depth from crown to root and spaced apart about 0.00125 inch. Radii at the crown and root are about 0.001 to 0.002 inch and the wall angle of each tooth is inclined at about 70° from the vertical. Variations may be provided in the wall angles and radii per example to 90° and 0.003 inch respectively. Each tooth 32 deforms the foil 28 surface, as shown in FIG. 3 to provide a flute 29. Accordingly, the flutes 29 follow the tool 31 contour, but not precisely because of the thickness of the foil and the embossing process. The embossing process is shown in FIG. 6.

Referring now to FIG. 6, in general, a strip of capacitor grade high purity soft annealed aluminum foil 28 of about 0.0022 inch thickness is passed between the hard cylindrical roll 31 of FIG. 5 and a softer cylindrical roll 33. Hard roll as a preferred example is a steel roll having engraved about its periphery a series of channels which provide the raised ribs or teeth 32 of FIG. 5. Teeth 32 are preferable axial or parallel to the longitudinal axis of roll 31 but also may be slightly tapered with respect to the longitudinal axis. In one example, roll 31 was about 1.5 inches in diameter and about 5.0 inches long. Each tooth 32 was about 0.002 to about 0.003 inches in both maximum width and depth and included 100 teeth per circumferential inch.

Roll 33 is a roll of softer material such as hard rubber plastic, etc. whose durameter hardness is in the range of 80 to 100, preferably about 80. Rolls 31 and 33 are adjusted towards each other by spring adjusting means 34 and against the foil until the teeth 32 of roll 31 press into the foil and the resulting foil indentation presses into the roll 33 material. The adjustment of the rolls may be controlled to provide the kind of indentation as illustrated in FIG. 3 and 4 from only one side of the foil. The rolls 31 and 33 may be driven, one may be driven, or, neither may be driven, and the foil merely pulled from between the rolls. The latter is a preferred process. In FIG. 6 the rolls 31 and 33 may be mounted on a capacitor roll winding machine 35 so that the embossing becomes a part of the capacitor roll winding process.

The combined hardness of the materials of roll 31 and 33, the force of the impression into roll 33, and the softness of the annealed aluminum foil 28, provide a permanent deformation of the flutes 29. The flutes 29 in the foil contain an apex which is slightly indented into the foil surface and also stretched. For this reason the pattern is quite resistant to total erasure and deformation. The extent of penetration of the teeth 31 into foil 28 will not only control the depth of the flutes but also the spacing of the base of the flutes from each other.

The use of specially patterned foil electrodes of this invention provides an improved impregnatable capacitor structure. It has been known to roughen the surface of aluminum electrodes in capacitor rolls by deformation, etching, abrading, etc. to facilitate impregnation of the roll. U.S. Pat. No. 3,746,953 is an example. Many such roughened electrode foils were found to have serious disadvantages in that the roughening processes formed irregular projections, sharp edges or caused some larger perforations of the foil leading to sharp edges, and sharp edges are areas of this voltage stress and corona discharge in a capacitor. These sharp edges cause cutting of the adjacent polypropylene film which weakens the dielectric strength of the film at that point. In the present invention any sharp edge of the tool will only cut or deform the interior of a flute which ordinarily does not come into contact with the film dielectric. Such cutting which may appear as long furrows at the interior edges of the crown are desirable in that they lend a degree of permanency to the pattern. A further disadvantage is that when foils were believed to require a high degree of roughness such as obtained from crimping and knurling processes, these roughened foils retained an excessive space factor in the roll. The high winding tension used in the winding process as well as the forces imposed on the foil in the capacitor assembly process tended to indiscriminately wipe out space factors which depended on foil bending alone such as corrugations.

Electrical capacitors according to FIG. 1 were assembled using the foil of this invention with excellent operating results. In one instance a group of capacitors were assembled using the foil of this invention when the foil contained a small area where the flutes were essentially non-existent. Electrical tests of these capacitors showed failures only at the smooth area, indicating that the fluted foil overcomes some failures.

Reference is made to U.S. Pat. No. 4,228,481-DiNicola et al assigned to the same assignee as the present invention, which is incorporated herein. The use of the line embossed foil of this invention follows the practices disclosed in DiNicola, et al in the use of patterned facts in that it is preferable to use the foil in capacitors where only a synthetic resin film such as polypropylene is the dielectric between electrodes. It is also desirable to use a roughened surface polypropylene film, and to arrange the films and foils so that a rough surface of either the film or foil is adjacent any smooth surface wherever possible. The improved foil of this invention provides a near maximum of direct channels running from the end of a capacitor roll straight to the center of the roll either perpendicularly or near perpendicularly. At the same time space factor is kept to a minimum and extremely resistant to deformations which would change the space factor. However, the foil is moderately compressible to accommodate tolerance variances of other materials thereby alleviating high stress points.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. In an electrical capacitor including a casing with electrical terminals thereon and one or more capacitor rolls in said casing and connected to the terminals and a dielectric fluid in the casing and impregnating the roll, the combination of
    (a) said roll comprising a pair of spaced line embossed metallic electrode foil strips and a dielectric therebetween consisting solely of a synthetic resin material and comprising at least one synthetic resin strip,
    (b) said electrode foil strips having closely spaced parallel flutes on the surface thereof running laterally across the strips to their edges and covering the length of the useful foil surface to provide a compressible thickness electrode,
    (c) said flutes providing a foil thickness measured vertically from a plane through the work hardened crowns of the flutes to a plane through the base edges of the flutes of less than about 3 times the original thickness of the foil between winding in said roll,
    (d) said flutes being formed and spaced apart in a manner whereby there is a smooth essentially continuously curving foil surface leading from one flute to an adjacent flute so that a point on the base of one flute and a point on the base of an adjacent flute are essentially coplanar.

2. The invention as recited in claim 1 wherein said foil thickness is less than 2 times the original noted thickness.

3. The invention as recited in claim 2 wherein the crowns of said flutes are spaced apart in the range of 0.01 to 0.02 inch, the height of said flutes are in the range of 0.001 to 0.003 inch and the side walls thereof are tapered at a wall angle to one another in the range of 70° to 90°.

4. An electrical capacitor grade aluminum foil comprising a soft annealed aluminum foil strip having an extended series of parallel individual smooth-surfaced flutes spaced apart in the range of 0.01 to 0.02 inch and essentially projecting from one side to the plane of the foil, said flutes running laterally across the strips to the edges thereof and covering the length of the foil surface useful as an electrode in making an electrical capacitor, said flutes being formed and spaced apart in a manner whereby there is a smooth essentially continuously curving planar foil surface leading from one flute to the next adjacent flute on said one side of the foil, and the wall angle of each flute at the internal small crown surface thereof is work hardened and is in the range of from about 70° to 90° to a vertical from said plane.

* * * * *

UNITED STATES PATENT AND TRADEMARK OFFICE
CERTIFICATE OF CORRECTION

PATENT NO. : 4,439,812
DATED : March 27, 1984
INVENTOR(S) : Thomas G. Chapman

It is certified that error appears in the above-identified patent and that said Letters Patent is hereby corrected as shown below:

Column 5, line 22: "end" should read "ends"

Column 6, line 12: "between" should read "before"

line 34: "to" should read "of"

Signed and Sealed this

Twenty-first Day of August 1984

[SEAL]

Attest:

GERALD J. MOSSINGHOFF

Attesting Officer     Commissioner of Patents and Trademarks